United States Patent
Gao et al.

(10) Patent No.: US 7,916,783 B2
(45) Date of Patent: Mar. 29, 2011

(54) BIT-RATE CONTROL METHOD AND DEVICE COMBINED WITH RATE-DISTORTION OPTIMIZATION

(75) Inventors: Wen Gao, Beijing (CN); Siwei Ma, Beijing (CN); Yan Lu, Beijing (CN)

(73) Assignee: Institute of Computing Technology, Chinese Academy of Sciences, Beijing (CN)

( * ) Notice: Subject to any disclaimer, the term of this patent is extended or adjusted under 35 U.S.C. 154(b) by 1469 days.

(21) Appl. No.: 10/521,877

(22) PCT Filed: Sep. 23, 2002

(86) PCT No.: PCT/CN02/00673
§ 371 (c)(1),
(2), (4) Date: Oct. 24, 2005

(87) PCT Pub. No.: WO2004/010702
PCT Pub. Date: Jan. 29, 2004

(65) Prior Publication Data
US 2006/0088099 A1 Apr. 27, 2006

(30) Foreign Application Priority Data
Jul. 22, 2002 (CN) .................................. 02 1 25274

(51) Int. Cl.
*H04N 11/02* (2006.01)
(52) U.S. Cl. ............................... 375/240.03; 375/240.02
(58) Field of Classification Search ............. 375/240.02, 375/240.16
See application file for complete search history.

(56) References Cited

U.S. PATENT DOCUMENTS

| | | | |
|---|---|---|---|
| 5,778,192 A | 7/1998 | Schuster et al. | |
| 6,115,421 A * | 9/2000 | Katta et al. | 375/240 |
| 6,507,616 B1 * | 1/2003 | Ryu | 375/240.13 |
| 6,807,231 B1 * | 10/2004 | Wiegand et al. | 375/240.12 |
| 7,280,700 B2 * | 10/2007 | Tourapis et al. | 382/238 |
| 2002/0163966 A1 * | 11/2002 | Ramaswamy | 375/240.03 |
| 2003/0063667 A1 * | 4/2003 | Sriram et al. | 375/240.05 |

FOREIGN PATENT DOCUMENTS

WO WO 00/49570 8/2000

* cited by examiner

*Primary Examiner* — Marsha D Banks Harold
*Assistant Examiner* — Christopher Findley
(74) *Attorney, Agent, or Firm* — J.C. Patents

(57) ABSTRACT

In the invention, a rate distortion optimization (RDO) based rate control scheme is comprised of following two steps: first, does bit allocation for every frame in a GOP, and based on the allocated bits, a predicted quantization parameter is used to do the first rate distortion optimization mode selection for every macroblock in the current frame; second, the information of the current macroblock collected from the first rate distortion mode selection is used to calculate a final quantization parameter for rate control, and if the final quantization parameter is different from the predicted one, a second rate distortion mode selection will be executed again. A rate distortion optimization based rate control implementation includes following modules: a video coding encoder module (for example, H.264/JVT processing module), rate distortion optimization based macroblock mode selection and adaptive quantization module, virtual buffer, and global complexity estimation module. As RDO and rate control are considered together in the invention, the RDO based rate control scheme can achieve better coding performance while with accurate target bitrate control.

27 Claims, 2 Drawing Sheets is an apparatus for the invention.

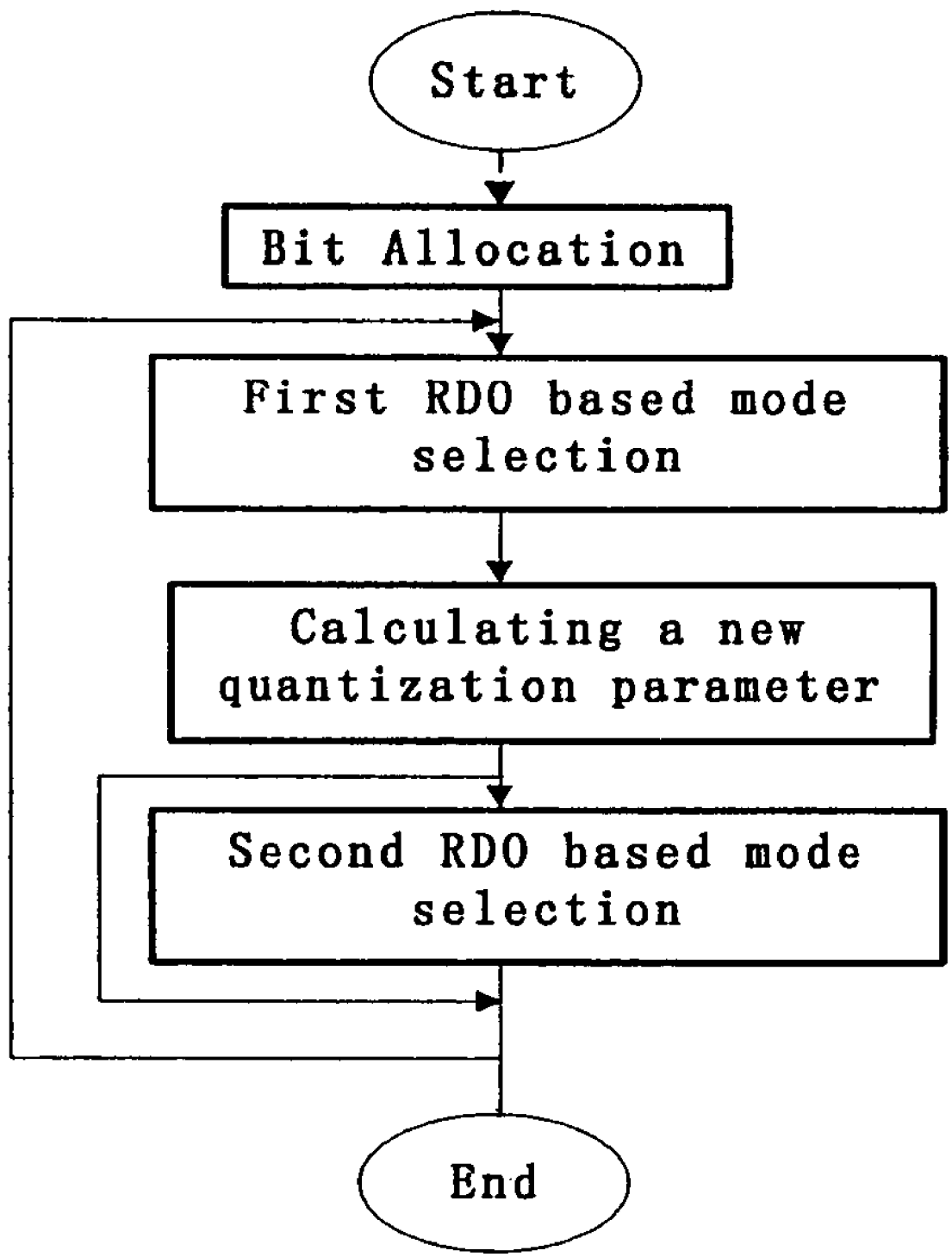
Figure 1 is an apparatus for the invention.

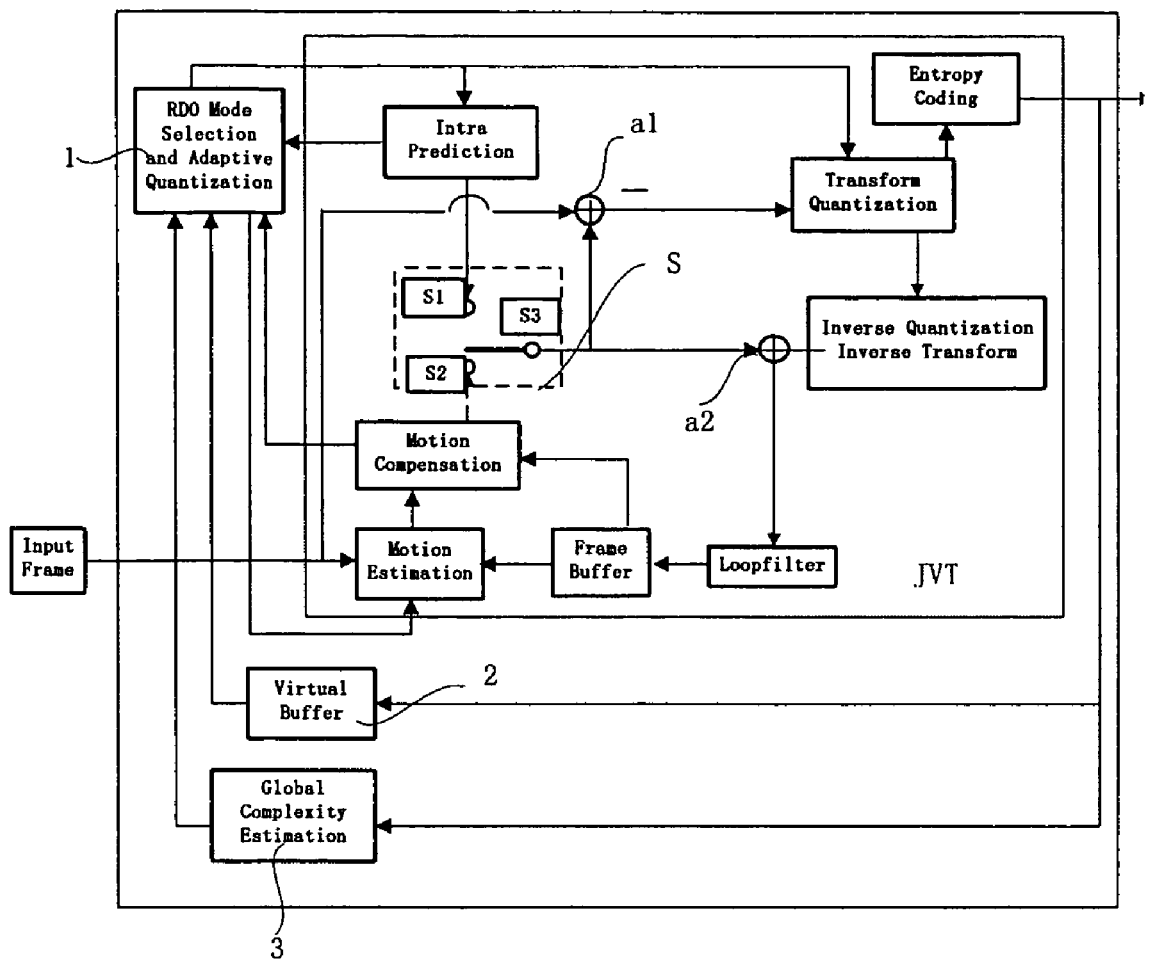
Figure 2 is an implementation of the invention on the JVT encoder

BIT-RATE CONTROL METHOD AND DEVICE COMBINED WITH RATE-DISTORTION OPTIMIZATION

BACKGROUND OF THE INVENTION

Advanced video coding techniques are important for multimedia storage and transmission. For this reason, many video coding standards have been standardized. H.264 is the latest video coding standard. H.264/AVC standard jointly developed by ISO and ITU-T—Joint Video Team (JVT), also known as MPEG-4 Part 10 and H.264 in the H.26x serial standards, has substantially outperformed the previous video coding standards by utilizing a variety of temporal and spatial predictions. Rate control is an important technique although it does not belong to the normative part in video coding standards. However, without rate control any video coding scheme would be practically useless in many applications because the client buffer may often under-flow and over-flow when a channel used to deliver the compressed stream is of constant bandwidth. Therefore, every video coding standard has its own rate control technique, for example, TM5 for MPEG-2 and TMN8 for H.263.

RDO is one of important video coding techniques. It is used to select optimal motion vectors an optimal coding mode for every macroblock. Yet the RDO used in H.264 test model makes it difficult to adopt the existing rate control techniques. Because rate control usually requires a pre-determined set of motion vectors and coding modes to select the quantization parameter, whereas RDO requires a pre-determined quantization parameter to select motion vectors and coding modes. On the other hand, as the complexity ratio between coded frame, the bit allocation model and adaptive quantization scheme should also be improved. The invention is a method and apparatus for rate distortion optimization based rate control. The invention can be used for video streaming, transmission, and storage coding.

SUMMARY OF THE INVENTION

The invention is to provide a method and apparatus of rate control for a video encoder, in which rate distortion optimization technique is used to improve coding efficiency.

BRIEF DESCRIPTION OF THE DRAWINGS

FIG. 1 is the flow chart of an embodiment according to the present invention.

FIG. 2 is the schematic structural view of the apparatus according to the present invention.

As shown in FIG. 2, a rate distortion optimization based rate control implementation includes following modules: JVT processing module, rate distortion optimization based macroblock mode selection module, virtual buffer, and global complexity estimation module.

JVT processing module receives the input frame data, and it is connected with RDO mode selection module, virtual buffer module and global complexity estimation module;

RDO mode selection module is connected with virtual buffer and global complexity estimation module. It receives the input signal from JVT processing module, and processes it based on the virtual buffer module and global complexity module status. In the last, the output signal is sent back to JVT processing module, JVT module will output the final coded macroblock.

Before coding a GOP, does bit allocation for the pictures in the GOP with the average picture size; The average picture size is calculated as:

R/F=R÷F, here, R is the target bit rate. F is the picture rate. R/F is the average picture size.

The bit allocation adjustment in the coded GOP is shown as follows:

$$T_b = \max\left\{\frac{R}{N_b + \frac{N_p K_b X_p}{K_p X_b}}, \frac{\text{bit\_rate}}{8 \times \text{picture\_rate}}\right\}$$

$$T_p = \max\left\{\frac{R}{N_p + \frac{N_b K_p X_b}{K_b X_p}}, \frac{\text{bit\_rate}}{8 \times \text{picture\_rate}}\right\}$$

$$T_i = \max\left\{\frac{R}{1 + \frac{N_p X_p}{K_p X_i} + \frac{N_b X_b}{K_b X_i}}, \frac{\text{bit\_rate}}{8 \times \text{picture\_rate}}\right\}$$

here, $T_i$, $T_p$ and $T_b$ is the bits allocated to the I, P or B frame respectively. $N_i$, $N_p$ and $N_b$ is the remained none coded I, P or B frames in the GOP respectively. $X_i$, $X_p$ and $X_b$ is the global complexity estimation for the I, P or B frame respectively and is defined as the multiplier between coded bits and average quantization parameter for the frame.

bit_rate is the target bit rate. picture rate is the frame rate.

$K_p$ and $K_b$ are constants. $K_p$, $K_b$ means the complexity ration between P, B frame and I frame respectively.

R is the remained bits for the GOP, and after coding a picture is updated as follows:

$R = R - S_{i,p,b}$ $S_{i,p,b}$ is the coded bits for the current frame.

Before coding a GOP, the remaining bits for the current GOP is initialized as follows:

$R = G + R_{prev}$ $G = \text{bit\_rate} \times N \div \text{picture\_rate}$ here, R is the remained bits for the current GOP.
N is the number of frames in current GOP.
G is the number of bits for a GOP.
$R_{prev}$ is the remained bits for the previous GOP. For the first GOP, $R_{prev}=0$.
$X_i$, $X_p$ and $X_b$ are initialized as:

$X_i = a \times \text{bit\_rate}$ $X_p = b \times \text{bit\_rate}$ $X_b = c \times \text{bit\_rate}$ here a, b and c are constants.
bit_rate is the target bitrate.

Does the mode selection while using the quantization parameter of previous macroblock as a prediction value for the current macroblock. The mode minimizes the following expression is selected as the initial coding mode for the current macroblock:

$D(s,c,\text{MODE}|QP) + \lambda_{MODE} R(s,c,\text{MODE}|QP)$ here, s is the luma value of the original macroblock. c is the luma value of the reconstructed macroblock. $\lambda_{MODE}$ is the lagrangian constant.

For I/P frame, $\lambda_{MODE}=0.85\times2^{Q_{m-1}/3}$;
For B frame, $\lambda_{MODE}=4\times0.85\times2^{Q_{m-1}/3}$.

D(s,c,MODE|QP) is used to evaluate the distortion of the current macroblock after it is coded.

R(s,c,MODE|QP) is the bits used to code the macroblock with mode MODE.

QP is the quantization parameter for current macroblock. for motion estimation in P or B frame, the motion vectors minimizes following expression are selected as the motion vectors for the current macroblock:

$$J(m,\lambda_{MOTION})=SA(T)D(s,c(m))+\lambda_{MOTION}R(m-p)$$

here, D(s,c(m)) is used to evaluate the distortion from motion compensation.

SA (T) D is sum of the absolute difference (or after Hadmard transform) for the macroblock.

R(m−p) is the bits used to code the motion vector.

s is the luma value of the current macroblock in the original frame.

c is the luma value in reference picture.

m is the motion vector.

p is the predicted motion vector.

$\lambda_{MOTION}$ is the lagrangian constant and $\lambda_{MOTION}=\sqrt{\lambda_{MODE}}$.

$\lambda_{MODE}$ is the lagrangian constant.

After the first rate distortion mode selection, the output of RDO mode selection module is sent to JVT processing module. A new quantization parameter will be calculated by the JVT processing module. The quantization parameter is adjusted according to macroblock activity.

After first rate distortion mode selection, the sum of the absolute difference is used as the macroblock activity estimation. The macroblock activity is calculated as:

$$act_m = \sum_{i,j} |s(i,j)-c(i,j)| \quad N\_act_m = \frac{(2\times act_j)+\text{avg\_act}}{act_j+(2\times\text{avg\_act})}$$

here, i is the horizontal position of the pixel in the current macroblock. j is the vertical position of the pixel in the current macroblock. $N\_act_m$ is the activity of the current macroblock. s(i,j) is the luma value of the original pixel(i,j), c(i,j) is the prediction value of pixel(i,j). avg_act is the average act, in the previous coded picture which is coded with the same type as current picture. $act_m$ is the sum of the absolute difference after motion compensation or intra prediction.

When coding the first frame, the virtual buffer occupancy is initialized with:

$$d_0^i=10\times r/31$$

$$d_0^P=K_p\times d_0^i$$

$$d_0^b=K_b\times d_0^i$$

here r is the virtual buffer size; $d_0^i$, $d_0^P$, and $d_0^b$ is the initial virtual buffer occupancy for i, p, or b frame. $K_p$ is the complexity ration between I, P frame; $K_b$ is the complexity ratio between I, B frame.

The RDO based rate control also includes a second RDO mode selection, after quantization parameter decision for the current macroblock. That is to say, the decided quantization parameter for the current macroblock will be used to RDO mode selection again. The mode which minimizes the following expression will be selected as coding mode for the current macroblock:

here, s is the luma value of the original macroblock. c is the luma value of the reconstructed macroblock. $\lambda_{MODE}$ is the lagrangian constant.

For I/P frame, $\lambda_{MODE}=0.85\times2^{Q_{m-1}/3}$;
For B frame, $\lambda_{MODE}=4\times0.85\times2^{Q_{m-1}/3}$.

D(s,c,MODE|QP) is used to evaluate the distortion of the current macroblock after it is coded.

R(s,c,MODE|QP) is the bits used to code the macroblock with mode MODE.

QP is the quantization parameter for current macroblock.

Quantization parameter from JVT processing module is sent back to JVT processing module, the macroblock is coded by JVT processing module and output.

Based on above modules, the drawbacks of traditional rate control schemes are removed. As RDO and rate control are considered together, the RDO based video coding can reach accurate target bitrate control while with good performance.

The invention claimed is:

1. A method for rate distortion optimization (RDO) based rate control comprising:

Step 1: performing bit allocation for every picture in a GOP which includes an I frame, a P frame, or a B frame, and based on the allocated bits a predicted quantization parameter being used to do a first rate distortion optimization mode selection for every macroblock in the current picture, wherein the predicted quantization parameter is the quantization parameter of a previous macroblock, and a coding mode minimizing the following formula is selected as the initial coding mode for the current macroblock:

$$D(s,c,MODE|QP)+\lambda_{MODE}R(s,c,MODE|QP)$$

wherein s is the luma value of the original macroblock, c is the luma value of the reconstructed macroblock, $\lambda_{MODE}$ is the lagrangian constant;

for I/P frame, $\lambda_{MODE}=0.85\times2^{Q_{m-1}/3}$;
for B frame, $\lambda_{MODE}=4\times0.85\times2^{Q_{m-1}/3}$;

D(s, c,MODE|QP) is used to evaluate the distortion of the current macroblock after it is coded with mode MODE;

R(s,c,MODE|QP) is the bits used to code the macroblock with mode MODE;

QP is a quantization parameter for the current macroblock, and is equal to the predicted quantization parameter in the first rate distortion mode selection;

Step 2: the information collected from the first rate distortion mode selection being used to calculate a final quantization parameter for rate control, and if the final quantization parameter is different from the predicted, a second rate distortion mode selection will be executed again.

2. The method of claim 1, wherein in step 1, before coding a GOP, bit allocation for the pictures in the GOP with the average picture size is performed.

3. The method of claim 2, wherein the average picture size is calculated as:

R/F=R÷F, here, R is the target bit rate. F is the picture rate. R/F is the average picture size.

4. The method of claim 1, further comprising performing bit allocation adjustment in the coded GOP, wherein the adjustment is implemented as follows:

$$T_i = \max\left\{\frac{R}{1+\frac{N_pX_p}{K_pX_i}+\frac{N_bX_b}{K_bX_i}}, \frac{\text{bit\_rate}}{8\times\text{picture\_rate}}\right\}$$

-continued $$T_p = \max\left\{\frac{R}{N_p + \frac{N_b K_p X_b}{K_b X_p}}, \frac{\text{bit\_rate}}{8 \times \text{picture\_rate}}\right\}$$

$$T_b = \max\left\{\frac{R}{N_p + \frac{N_p K_b X_p}{K_p X_b}}, \frac{\text{bit\_rate}}{8 \times \text{picture\_rate}}\right\}$$

here, $T_I$, $T_p$ and $T_b$ is the bits allocated to the I, P or B frame respectively; $N_i$, $N_p$ and $N_b$ is the remained none coded I, P or B frames in the GOP respectively; $X_i$, $X_p$ and $X_b$ is the global complexity estimation for the I, P or B frame respectively and is defined as the multiplier between coded bits and average quantization parameter for the frame;

bit_rate is the target bit rate, picture_rate is the frame rate;

$K_p$ and $K_b$ are constants, $K_p$, $K_b$ means the complexity ratio between P, B frame and I frame respectively;

R is the remained bits for the GOP, and after coding a picture it is updated as follows:

$R=R-S_{i,p,b}$ $S_{i,p,b}$ is the coded bits for the current frame.

5. The method of claim 4, wherein before coding a GOP, the remaining bits for the current GOP is initialized as follows:

$R=G+R_{prev}$ $G=\text{bit\_rate} \times N \div \text{picture\_rate}$ here, R is the remained bits for the current GOP;

N is the number of frames in the current GOP;

G is the number of bits for a GOP;

$R_{prev}$ is the remained bits for the previous GOP, for the first GOP, $R_{prev}=0$.

6. The method of claim 4, wherein $X_i$, $X_p$ and $X_b$ are initialized as:

$X_i = a \times \text{bit\_rate}$ $X_p = b \times \text{bit\_rate}$ $X_b = c \times \text{bit\_rate}$ here a, b and c are constants;

bit_rate is the target bitrate.

7. The method of claim 1, wherein for motion estimation in P or B frame, the motion vector minimizing following expression is selected as the motion vector for the current macroblock:

$J(m,\lambda_{MOTION})=SA(T)D(s,c(m))+\lambda_{MOTION}R(m-p)$ here, $D(s,c(m))$ is used to evaluate the distortion from motion compensation;

SA(T)D is the sum of the absolute difference after prediction (or after Hadmard transform) for the macroblock;

R(m−p) is the bits used to code the motion vector;

s is the luma value of the current macroblock in the original frame;

c is the luma value in reference picture;

m is the motion vector;

p is the predicted motion vector;

$\lambda_{MOTION}$ is the lagrangian constant and $\lambda_{MOTION}=\sqrt{\lambda_{MODE}}$;

$\lambda_{MODE}$ is the lagrangian constant.

8. The method of claim 2, wherein after the first rate distortion mode selection, the RDO based rate control further includes: calculating quantization parameter for the current macroblock; the quantization parameter is adjusted according to the macroblock activity and buffer status.

9. The method of claim 8, wherein the quantization parameter for the macroblock is adjusted according to the macroblock activity; after the first rate distortion mode selection, the sum of the absolute difference is used as the macroblock activity estimation; the macroblock activity is calculated as:

$$act_m = \sum_{i,j}|s(i,j)-c(i,j)| \quad N\_act_m = \frac{(2 \times act_j)+\text{avg\_act}}{act_j+(2 \times \text{avg\_act})}$$

here, i is the horizontal position of the pixel in the current macroblock; j is the vertical position of the pixel in the current macroblock; $N\_act_m$ is the activity of the current macroblock; s(i,j) is the luma value of the original pixel (i, j), c(i, j) is the prediction value of pixel(i, j); avg_act is the average $act_m$ in the previous coded picture which is coded with the same type as current picture; $act_m$ is the sum of the absolute difference after motion compensation or intra prediction.

10. The method of claim 8, wherein a virtual buffer is used to do rate control; first set up the mapping from the virtual buffer occupancy to macroblock quantization parameter, and the final macroblock quantization parameter is calculated as:

$$Q_m = \left(\frac{d_m^n \times 31}{r}\right) \times N\_act_m$$

$$d_m^n = d_0^n + B_{m-1} - T_n \times (m-1)/MB\_CNT$$

$$r = 2 \times \text{bit\_rate}/\text{picture\_rate}$$

here, $Q_m$ is the quantization parameter of current macroblock;

$d_m^n$ is the current buffer occupancy, and it equals $d_m^I$, $d_m^P$, and $d_m^b$ for I, P, B frame respectively;

$B_{m-1}$ is the bits used to code previous macroblock;

$d_0^n$ is the initial buffer occupancy for current frame, n is i, p or b, corresponding to $d_0^i$, $d_0^p$, and $d_0^b$;

r is the size of virtual buffer.

11. The method of claim 10, wherein, when coding the first frame, the virtual buffer occupancy is initialized with:

$d_0^b = K_b \times d_0^i$ $d_0^i = 10 \times r/31$ $d_0^p = K_p d \times_0^i$ here r is the virtual buffer size; $d_0^i$, $d_0^p$, and $d_0^b$ is the initial virtual buffer occupancy for i, p, or b frame; $K_p$ is the complexity ratio between I, P frame; $K_b$ is the complexity ratio between I, B frame.

12. The method of claim 11, wherein the RDO based rate control also includes a second RDO mode selection, after calculating the final quantization parameter for the current macroblock; thus the selected quantization parameter for the current macroblock will be used to do RDO mode selection again; the mode which minimizes the following expression will be selected as the coding mode for the current macroblock:

$D(s,c,\text{MODE}|QP)+\lambda_{MODE}R(s,c,\text{MODE}|QP)$ here, s is the luma value of the original macroblock, c is the luma value of the reconstructed macroblock, $\lambda_{MODE}$ is the lagrangian constant;

for I/P frame, $\lambda_{MODE}=0.85\times 2^{Q_m-1/3}$;

for B frame, $\lambda_{MODE}=4\times 0.85\times 2^{Q_m-1/3}$;

D(s,c,MODE|QP) is used to evaluate the distortion of the current macroblock coded with mode MODE;

R(s,c,MODE|QP) is the bits used to code the macroblock with mode MODE;

QP is the quantization parameter for the current macroblock.

13. The method of claim 12, wherein for motion estimation in P or B frame, the motion vector minimizing following expression is selected for the current macroblock:

$$J(m,\lambda_{MOTION})=SA(T)D(s,c(m))+\lambda_{MOTION}R(m-p)$$

here, D(s,c(m)) is used to evaluate the distortion from motion compensation;

SA(T)D is the sum of the absolute difference (or after Hadmard transform) for the macroblock;

R(m−p) is the bits used to code the motion vector;

s is the luma value of the current macroblock in the original frame;

c is the luma value in reference picture;

m is the motion vector;

p is the predicted motion vector;

$\lambda_{MOTION}$ is the lagrangian constant and $\lambda_{MOTION}=\sqrt{\lambda_{MODE}}$;

$\lambda_{MODE}$ is the lagrangian constant.

14. An apparatus for a rate distortion optimization (RDO) based rate control comprising: a video coding encoder module comprising a JVT processing module, a RDO mode selection and adaptive quantization module, a virtual buffer, and a global complexity estimation module;

wherein, the JVT processing module receives an input frame, and is connected with the RDO mode selection and adaptive quantization module, the virtual buffer and the global complexity estimation module;

the RDO mode selection and adaptive quantization module is connected with the virtual buffer and the global complexity estimation module, and is configured to receive an input signal from the JVT processing module, and to process the input signal based on the status of the virtual buffer and the global complexity module;

bit allocation for every picture in a GOP which includes an I frame, a P frame, or a B frame is conducted, a first rate distortion optimization mode selection for every macroblock in the current picture using a predicted quantization parameter based on the allocated bits is conducted, wherein the predicted quantization parameter is the quantization parameter of a previous macroblock, and a coding mode minimizing the following formula as the initial coding mode for the current macroblock is selected:

$$D(s,c,MODE|QP)+\lambda_{MODE}R(s,c,MODE|QP)$$

where s is the luma value of the original macroblock, c is the luma value of the reconstructed macroblock, $\lambda_{MODE}$ is the lagrangian constant;

for I/P frame, $\lambda_{MODE}=0.85\times 2^{Q_m-1/3}$;

for B frame, $\lambda_{MODE}=4\times 0.85\times 2^{Q_m-1/3}$;

D(s,c,MODE|QP) is used to evaluate the distortion of the current macroblock after it is coded with mode MODE;

R(s,c,MODE|QP) is the bits used to code the macroblock with mode MODE;

QP is the quantization parameter for the current macroblock, and is equal to the predicted quantization parameter in the first rate distortion mode selection;

and the RDO mode selection and adaptive quantization module is configured to calculate a final quantization parameter for rate control using the information collected from the first rate distortion mode selection, and if the final quantization parameter is different from the predicted, execute a second rate distortion mode selection);

the JVT processing module is configured to output the final coded macroblock with the calculated parameter.

15. The apparatus of claim 14, wherein before coding a GOP, bit allocation for the pictures in the GOP with the average picture size is conducted.

16. The apparatus of claim 15, wherein the average picture size is calculated as:

R/F=R÷F, here, R is the target bit rate, F is the picture rate, R/F is the average picture size.

17. The apparatus of claim 16, wherein a bit allocation adjustment in the GOP is conducted, the adjustment is shown as follows:

$$T_i = \max\left\{\frac{R}{1+\frac{N_p X_p}{K_p X_i}+\frac{N_b X_b}{K_b X_i}}, \frac{\text{bit\_rate}}{8\times\text{picture\_rate}}\right\}$$

$$T_b = \max\left\{\frac{R}{N_b+\frac{N_p K_b X_p}{K_p X_b}}, \frac{\text{bit\_rate}}{8\times\text{picture\_rate}}\right\}$$

$$T_p = \max\left\{\frac{R}{N_p+\frac{N_b K_p X_b}{K_b X_p}}, \frac{\text{bit\_rate}}{8\times\text{picture\_rate}}\right\}$$

here, $T_i$, $T_p$ and $T_b$ is the bits allocated the to the I, P or B frame respectively; $N_i$, $N_p$ and $N_b$ is the remained none coded I, P or B frames in the GOP respectively; $X_i$, $X_p$ and $X_b$ is the global complexity estimation for the I, P or B frame respectively and is defined as the multiplier between the coded bits and average quantization parameter for the frame;

bit_rate is the target bit rate, picture_rate is the frame rate;

$K_p$ and $K_b$ are constants, $K_p$, $K_b$ means the complexity ratio between P, B frame and I frame respectively;

R is the remained bits for the GOP, and after coding a picture it is updated as follows:

$$R=R-S_{i,p,b}$$

$S_{i,p,b}$ is the coded bits for the current frame.

18. The apparatus of claim 17, wherein before coding a GOP, the remaining bits for the current GOP is initialized as follows:

$$R=G+R_{prev}$$

$$G=\text{bit\_rate}\times N\div\text{picture\_rate}$$

here, R is the remained bits for the current GOP;

N is the number of frames in current GOP;

G is the number of bits for a GOP;

$R_{prev}$ is the remained bits for the previous GOP, for the first GOP, $R_{prev}=0$.

19. The apparatus of claim 17, wherein $X_i$, $X_p$ and $X_b$ are initialized as:

$$X_i=a\times\text{bit\_rate}$$

$$X_p=b\times\text{bit\_rate}$$

$$X_b=c\times\text{bit\_rate}$$

here a, b and c are constants;
bit_rate is the target bitrate.

20. The apparatus of claim 14, wherein for motion estimation in P or B frame, the motion vector minimizing following expression is selected for the current macroblock:

$$J(m, \lambda_{MOTION}) = SA(T)D(s,c(m)) + \lambda_{MOTION} R(m-p)$$

here, D(s,c(m)) is used to evaluate the distortion from motion compensation;
SA(T)D is sum of the absolute difference (or after Hadmard transform) for the macroblock;
R(m−p) is the bits used to code the motion vector;
s is the luma value of the current macroblock in the original frame;
c is the luma value in reference picture;
m is the motion vector;
p is the predicted motion vector;
$\lambda_{MOTION}$ is the lagrangian constant and $\lambda_{MOTION} = \sqrt{\lambda_{MODE}}$;
$\lambda_{MODE}$ is the lagrangian constant.

21. The apparatus of claim 20, wherein after the first rate distortion mode selection, the rate control scheme further includes: calculating a new quantization parameter and adjusting the new quantization parameter according to the macroblock activity and buffer status.

22. The apparatus of claim 20, wherein for adjusting quantization parameter for the current macroblock, the sum of the absolute difference is used as the macroblock activity estimation after first rate distortion mode selection, and the macroblock activity is calculated as:

$$act_m = \sum_{i,j} |s(i,j) - c(i,j)| \quad N\_act_m = \frac{(2 \times act_j) + \text{avg\_act}}{act_j + (2 \times \text{avg\_act})}$$

here, i is the horizontal position of the pixel in the current macroblock, j is the vertical position of the pixel in the current macroblock, $N\_act_m$ is the activity of the current macroblock, s(i,j) is the luma value of the original pixel (i, j), c(i, j) is the prediction value of pixel(i, j), avg_act is the average $act_m$ in the previous coded picture which is coded with the same type as current picture, $act_m$ is the sum of the absolute difference after motion compensation or intra prediction.

23. The apparatus of claim 20, wherein the virtual buffer is used to do rate control: first setting up the mapping from the virtual buffer occupancy to macroblock quantization parameter, the macroblock quantization parameter is calculated as:

$$Q_m = \left(\frac{d_m^n \times 31}{r}\right) \times N\_act_m$$

$$r = 2 \times \text{bit\_rate} / \text{picture\_rate}$$

$$d_m^n = d_0^n + B_{m-1} - T_n \times (m-1)/MB\_CNT$$

here, $Q_m$ is the quantization parameter of current macroblock;
$d_m^n$ is the current buffer occupancy, and it equals $d_m^I$, $d_m^P$, and $d_m^b$ for I, P, B frame respectively;
$B_{m-1}$ is the bits used to code previous macroblock;
$d_0^n$ is the initial buffer occupancy for current frame, n is i, p or b, corresponding to $d_0^i$, $d_0^P$, and $d_0^b$;
r is the size of virtual buffer occupancy.

24. The apparatus of claim 23, wherein when coding the first frame, the virtual buffer occupancy is initialized with:

$$d_0^i = 10 \times r/31$$

$$d_0^P = K_p \times d_0^i$$

$$d_0^b = K_b \times d_0^i$$

here r is the virtual buffer size; $d_0^i$, $d_0^P$, and $d_0^b$ is the initial virtual buffer occupancy for i, p, or b frame; $K_p$ is the complexity ratio between I, P frame; $K_b$ is the complexity ratio between I, B frame.

25. The apparatus of claim 21, wherein the RDO based rate control also includes a second RDO mode selection, after quantization parameter decision for the current macroblock, thus the decided quantization parameter for the current macroblock will be used to do RDO mode selection again; the mode which minimizes the following expression will be selected as coding mode for the current macroblock:

$$D(s,c,MODE|QP) + \lambda_{MODE} R(s,c,MODE|QP)$$

here, s is the luma value of the original macroblock, c is the luma value of the reconstructed macroblock, $\lambda_{MODE}$ is the lagrangian constant;
for I/P frame, $\lambda_{MODE} = 0.85 \times 2^{Q_{m-1}/3}$;
for B frame, $\lambda_{MODE} = 4 \times 0.85 \times 2^{Q_{m-1}/3}$;
D(s,c,MODE|QP) is used to evaluate the distortion of the current macroblock after it is coded;
R(s,c,MODE|QP) is the bits used to code the macroblock with mode MODE;
QP is the quantization parameter for current macroblock.

26. The apparatus of claim 25, wherein for motion estimation in P or B frame, the motion vectors minimizes following expression are selected as the motion vectors for the current macroblock:

$$J(m, \lambda_{MOTION}) = SA(T)D(s,c(m)) + \lambda_{MOTION} R(m-p)$$

here, D(s,c(m)) is used to evaluate the distortion from motion compensation;
SA(T)D is sum of the absolute difference (or after Hadmard transform) for the macroblock;
R(m−p) is the bits used to code the motion vector;
s is the luma value of the current macroblock in the original frame;
c is the luma value in reference picture;
m is the motion vector;
p is the predicted motion vector;
$\lambda_{MOTION}$ is the lagrangian constant and $\lambda_{MOTION} = \sqrt{\lambda_{MODE}}$;
$\lambda_{MODE}$ is the lagrangian constant.

27. The apparatus of claim 26, wherein quantization parameter from the RDO mode selection and adaptive quantization module is sent back to the JVT processing module, the macroblock is coded by the JVT processing module and output of the JVT processing module.

* * * * *